United States Patent
Avinger

(12) 
(10) Patent No.: US 6,575,416 B1
(45) Date of Patent: Jun. 10, 2003

(54) ADJUSTABLE LENGTH OVER-THE DOOR HANGER

(75) Inventor: Andrew G. Avinger, Lubbock, TX (US)

(73) Assignee: Gemmy Industries, Inc., Irving, TX (US)

( * ) Notice: Subject to any disclaimer, the term of this patent is extended or adjusted under 35 U.S.C. 154(b) by 0 days.

(21) Appl. No.: 10/108,213

(22) Filed: Mar. 26, 2002

(51) Int. Cl.[7] .............................................. F16B 45/00
(52) U.S. Cl. ..................... 248/307; 248/304; 248/333; 248/327; 248/215
(58) Field of Search ................................ 248/304, 305, 248/307, 215, 225.21, 274.1, 295.11, 159, 408, 317, 327, 323, 333, 339

(56) References Cited

U.S. PATENT DOCUMENTS

| | | | |
|---|---|---|---|
| 486,804 A | * 11/1892 | Wood | |
| 1,294,916 A | * 2/1919 | Knight | |
| 3,536,287 A | 10/1970 | Kramer | 248/301 |
| D275,917 S | * 10/1984 | Einhorn | D6/567 |
| D304,545 S | 11/1989 | Hurrelbrink | D8/373 |
| 5,014,948 A | 5/1991 | Asaro et al. | 248/215 |
| 5,413,297 A | 5/1995 | Adams | 248/215 |
| D365,015 S | 12/1995 | Avinger | D8/373 |
| 5,542,631 A | * 8/1996 | Bruno | 248/58 |
| 5,645,178 A | * 7/1997 | Conley, Jr. | 211/87.01 |
| 6,145,678 A | * 11/2000 | Morrison | 211/113 |
| 6,299,118 B1 | * 10/2001 | Farrell | 248/237 |
| 6,311,851 B1 | * 11/2001 | Knudsen, Sr. et al. | 211/13.1 |
| 6,325,344 B1 | 12/2001 | Gary et al. | 248/206.3 |

* cited by examiner

*Primary Examiner*—Anita King
*Assistant Examiner*—Steven Marsh
(74) *Attorney, Agent, or Firm*—Locke Liddell & Sapp LLP; Monty L. Ross

(57) ABSTRACT

An adjustable length over-the-door hanger for hanging a wreath or other hanging objects on a door whose length can be adjusted to position the hanging object at the desired height. The hanger is made of two vertical supports that are held together and where the lower vertical support can slide along the upper vertical support to lengthen or shorten the overall length of the hanger. A track on one support is engaged by a finger on the other support thereby allowing the hanger to be locked into any one of a number of fixed positions corresponding to the desired height for the wreath to be hung on the door. This positioning allows the hanger to be easily adjusted while in place on the door. The hanger has a hook that allows it to hang over the top of the door and another hook at the bottom on which the hanging object can be hung.

11 Claims, 3 Drawing Sheets

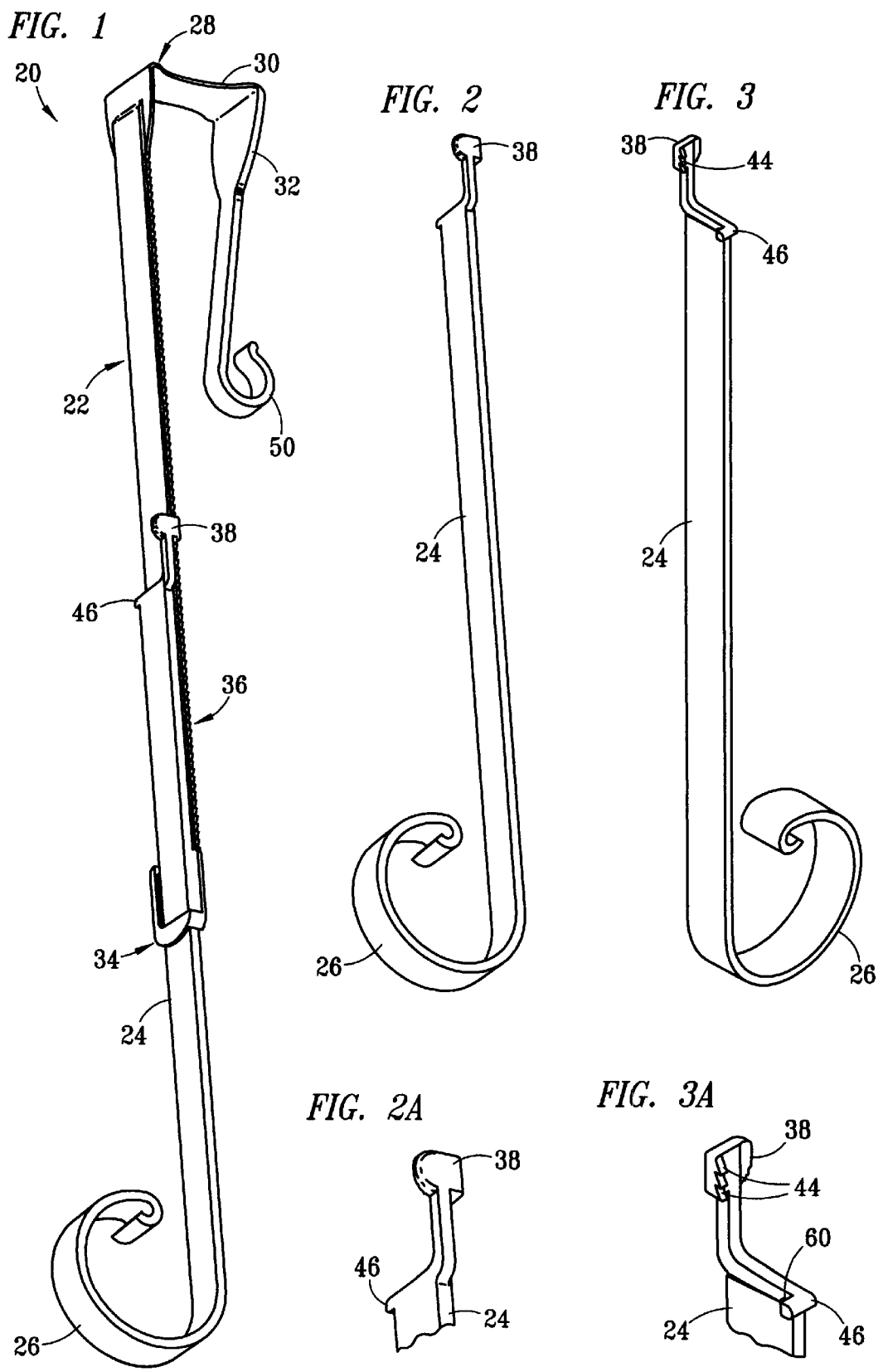

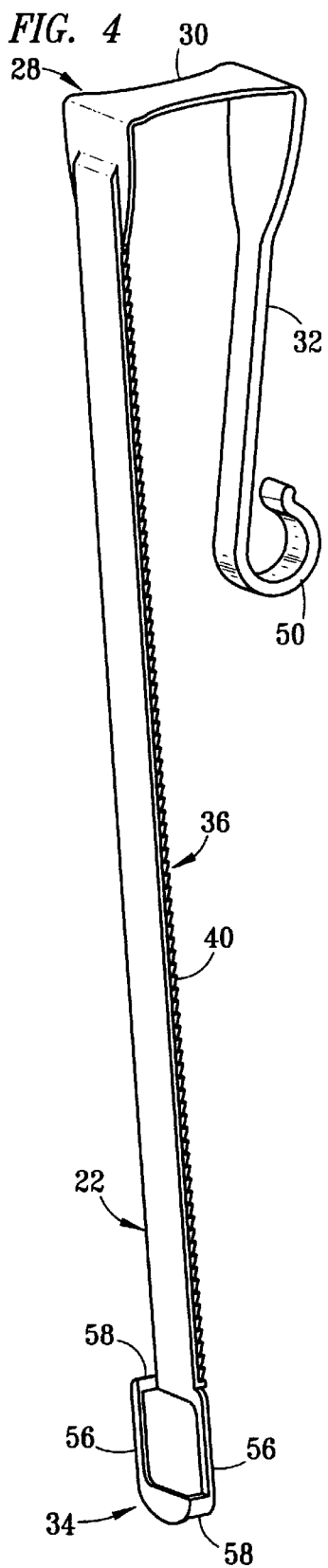
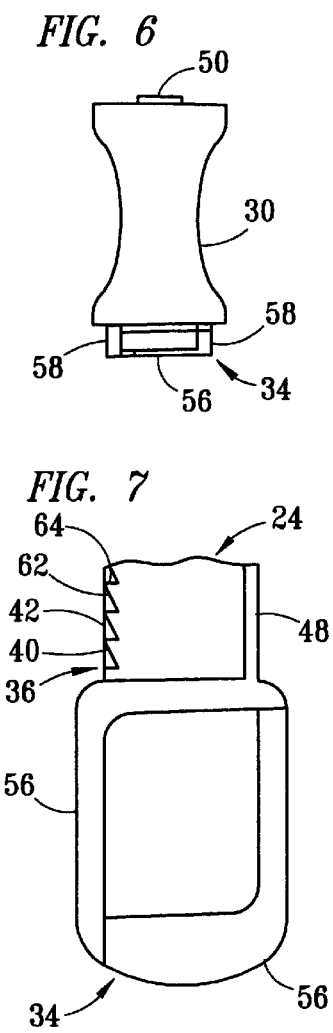
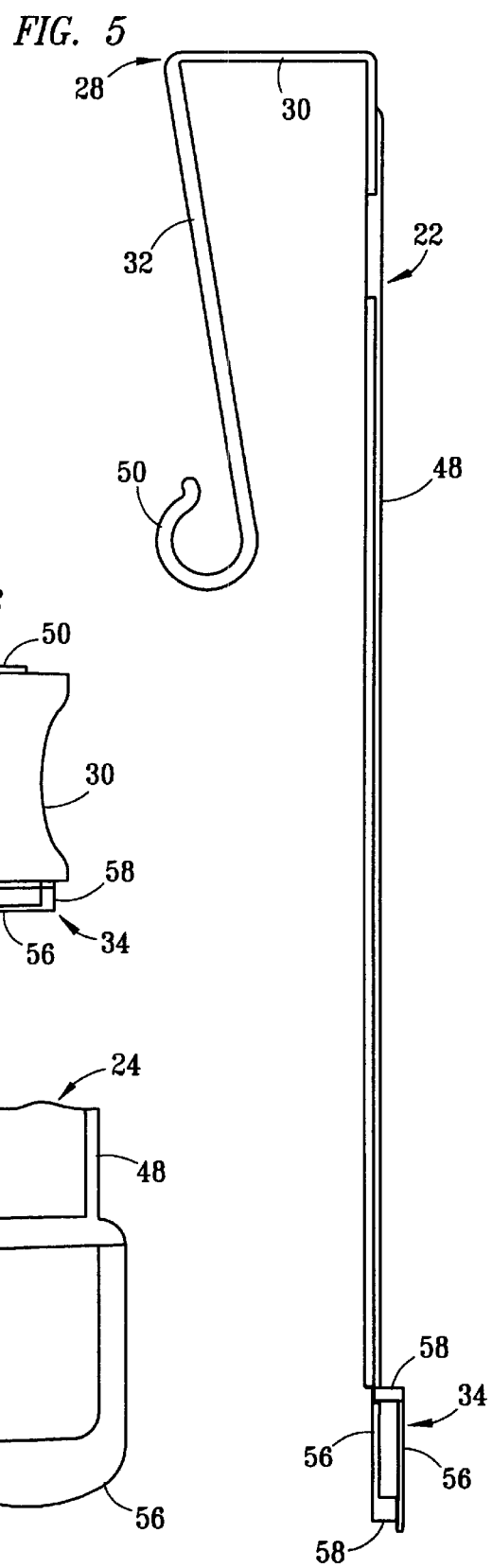

ADJUSTABLE LENGTH OVER-THE DOOR HANGER

BACKGROUND OF THE INVENTION

1. Field of the Invention

This invention relates generally to over-the-door hangers and, more particularly, to an over-the-door hanger that has an adjustable overall length in order to hang objects at various heights.

2. Description of Related Art

Over-the-door hangers have been used for a number of years. The basic structure generally includes a metal or piece of molded plastic that can be hung over the top of a door and extends down the face of the door, terminating in a hook used to support the item being hung. The advantage of these hangers is that items such as wreaths can be hung without the need to permanently attach anything to the door. This is especially useful for hanging seasonal items such as a wreath that is only hung on the door for a relatively short period of time during the year.

However, these hangers are of fixed length. Depending on what is being hung on the door and the height desired a user needs either to have a number of hangers of different lengths or to know the exact length desired before purchasing the hanger. In addition, with hangers only made in certain lengths, there is no way to conveniently hang an object at an intermediate height.

More recently over-the-door hangers have been made that have an adjustable length to hang an object at a desired height. One such hanger has two vertical pieces, one having a single, rearward-facing projection that engages a set of forwardly facing detent structures on the other piece. Adjusting the length of the hanger requires manually bending the two pieces apart so as to disengage the rearward facing projection from the recess in the other vertical piece and then slide the vertical pieces at the same time.

It is often desirable to adjust the length of the hanger once it has already been placed upon the door. Therefore, there is a need for an adjustable length over-the-door hanger that can be easily adjusted while in position on the door.

SUMMARY OF THE INVENTION

The subject invention comprises an adjustable over-the-door hanger. The subject hanger allows the user to adjust the overall length of the hanger so that the lower hook upon which an object is hung can be placed at a desired height for hanging the object. The subject hanger is made up of two vertical supports that slide along each other to either shorten or lengthen the overall length of the hanger. A door hook on the top of the upper vertical support hooks over the top of the door and secures the hanger to the front of the door. There is also a lower hook at the bottom of the lower vertical support upon which the desired object can be hung. At the bottom of the upper vertical support, an enclosure wraps around the lower vertical support and prevents it from moving out of slidable contact with the upper vertical support. Along one of the sides of the upper vertical support there is an engagement track and along the opposite side there is a support track. At the top of the lower vertical support there are two finger projections. An engagement finger selectively engages the engagement track on the upper vertical support to prevent the lower vertical support from sliding downwardly relative to the upper vertical support. On the opposite side from the engagement finger is a support finger that has a support groove through which the support track runs. The support finger keeps the upper vertical support in slidable contact with the lower vertical support and prevents it from moving away from the engagement finger. Because the engagement finger and engagement track are located on the side of the vertical supports, it can easily be disengaged for adjustment while the adjustable over-the-door hanger is in place on a door.

In a preferred embodiment, the engagement track is made up of teeth and the engagement finger contains corresponding teeth that are able to seat in between the track teeth and prevent the lower vertical support from sliding further down. The teeth provide discrete adjustment points and allow the hanger to support a greater amount of weight than if the engagement track was a flat surface frictionally engaged by the engagement finger. The engagement finger is preferably resiliently biased to engage the engagement track. This allows the hanger to be in a locked configuration at all times that it is not being adjusted. The support track is preferably thinner than the upper vertical support allowing the support track to fit in the support groove of the support finger. The upper vertical support so that the upper vertical support will preferably lie flat against the front surface of the door.

BRIEF DESCRIPTION OF THE DRAWINGS

The apparatus of the invention is further described and explained in relation to the following figures of the drawings wherein:

FIG. 1 is a front perspective view of the adjustable length over-the-door hanger;

FIG. 2 is a front perspective view of the lower support of the adjustable length over-the-door hanger;

FIG. 2A is a detailed of the top of the lower vertical support shown in FIG. 2;

FIG. 3 is a rear perspective view of the lower vertical support;

FIG. 3A is a detailed view of the top of the lower vertical support shown in FIG. 3;

FIG. 4 is a front perspective view of the upper vertical support;

FIG. 5 is a left side elevation view of the upper vertical support;

FIG. 6 is a top plan view of the upper vertical support;

FIG. 7 is a detailed view of the bottom end of the upper vertical support;

DETAILED DESCRIPTION OF THE PREFERRED EMBODIMENT

Figure 8:
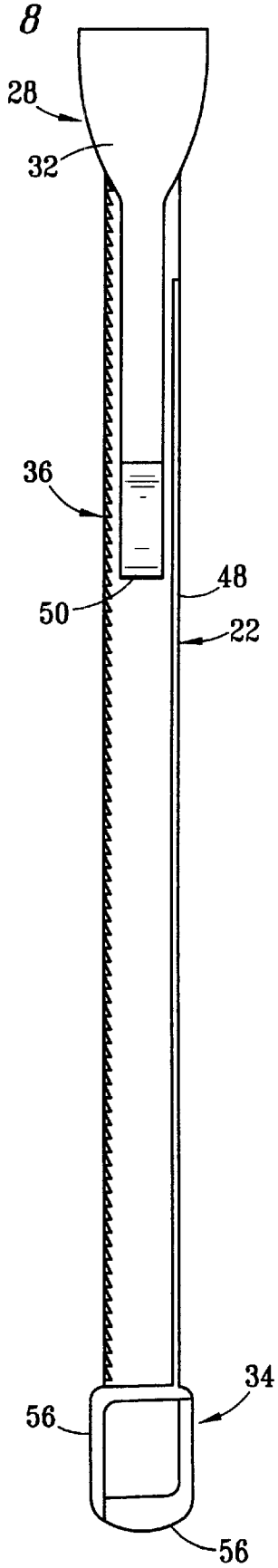
FIG. 8 is a rear plan view of the upper vertical support.

Referring to FIG. 1, the adjustable length over-the-door hanger 20 comprises an upper vertical support 22 and a lower vertical support 24. The back face of lower vertical support 24 is slidably connected to the front face of upper vertical support 22. When lower vertical support 24 slides down upper vertical support 22, the overall length of adjustable length over-the-door hanger 20 increases. Sliding lower vertical support 24 up along upper vertical support 22 shortens the overall length of adjustable length over-the-door hanger. Door hook 28 is integrally molded or otherwise attached to the top of upper vertical support 22 and lower hanger 26 is integrally molded or otherwise attached to the bottom of lower vertical support 24. Upper vertical support 22 has an engagement track 36 on one side of upper vertical support 22. Engagement finger 38 is disposed at the top of lower vertical support 24. As shown in FIG. 1, engagement finger 38 engages track teeth 40, which make up engagement track 36 located on one side of upper vertical support 22. Support finger 46 is disposed on the opposite side of the top of lower vertical support 24 from engagement finger 38. A support groove 60, best shown in FIG. 3A, is formed integrally with support finger 46 and is configured for the slidable reception of support track 48. Finally enclosure 34 is disposed at the bottom of upper vertical support 22. Enclosure 34 and support finger 46 maintain upper vertical support 22 and lower vertical support 24 in slidable alignment and in a position where engagement finger 38 can engage engagement track 36.

Referring to FIGS. 2 and 3, lower hanger 26 is located at the bottom of lower vertical support 24. Lower hanger 26 is formed by integrally molding the lower end of lower vertical support 24 in a curled circular shape. The exact size and shape of the lower hanger can vary depending on what object is desired to be hung on the door.

As shown more clearly in FIGS. 2A and 3A, engagement finger 38 and support finger 46 are disposed at the top of lower vertical support 24. Engagement finger 38 contains finger teeth 44 which are cooperatively engageable with track recesses 42 between track teeth 40 on engagement track 36 as shown more clearly in FIG. 7. Engagement finger 38 is made of a resilient material and is biased to a position where finger teeth 44 remain engaged with track teeth 40. This prevents lower vertical support 24 from sliding any further down upper vertical support 22. Engagement finger 38 can be digitally deformed to pull finger teeth 44 away from track teeth 40, thereby disengaging engagement finger 38 from engagement track 36. This allows lower vertical support 24 to slide along upper vertical support 22 and the overall length of adjustable length over-the-door hanger 20 to be changed as desired. Releasing pressure from engagement finger 38 will allow it to return to its original position and reengage with engagement track 36, resulting in lower vertical support 24 being locked into a new configuration compared to upper vertical support 22.

Referring to FIGS. 4 through 8, door hook 28 is attached at the top of upper vertical support 22. Door hook 28 is made up of horizontal piece 30 and vertical piece 32. Horizontal piece 30 is perpendicular to upper vertical support 22 and is thin enough to fit over the top of the door and not substantially hinder the closing of the door. Vertical piece 32 is desirably inwardly biased to frictionally engage the back surface of the door. This can be achieved as shown in FIG. 5 where vertical piece 32 is attached to horizontal piece 30 at somewhat less than ninety degrees. Vertical piece 32 is preferably made out of a resilient semi-flexible material such as plastic. Door hook 28 can also optionally have decorative hook 50 on the end of vertical piece 32, thereby allowing an additional item to be hung on the inside of the door.

As shown more clearly in FIG. 7, enclosure 34 is disposed at the bottom of upper vertical support 22. Enclosure 34 wraps around lower vertical support 24 and allows lower vertical support to slide freely through and maintains slidable contact between upper vertical support 22 and lower vertical support 24. In the embodiment shown the enclosure is formed by two 'L' shaped pieces 56, one of which is rotated 180 degrees and connected by two posts 58 at each end of the 'L' so that one 'L' is higher than the other is. This is not the only configuration possible and enclosure 34 could, for example, be a single band wrapped around lower vertical support 24. Enclosure 34 also does not have to wrap entirely around lower vertical support 24 as long as it can maintain lower vertical support 24 in slidable contact with upper vertical support 22 by preventing the lower vertical support 24 from moving to either side and from lifting off upper vertical support 22.

Upper vertical support 22 has engagement track 36 on one of its vertical edges and support track 48 on the other vertical edge. Support track 48 is preferably thinner than the upper vertical support 22, thereby allowing support track 48 to be slidably received by support groove 60. As shown more clearly in FIG. 7, engagement track 36 is made up of track teeth 40 and the spaces between individual teeth are track recesses 42. Track teeth 40 have a horizontal top face 64 and a sloping bottom face 62. Finger teeth 44 have a shape matching track recess 42. Therefore finger teeth 44 have a sloping top face cooperatively aligned and engageable with sloping bottom face 62 of track teeth 40 and a horizontal bottom face cooperatively aligned and engageable with horizontal top face 64 of track teeth 40.

When engaged with the corresponding finger teeth 44 on engagement finger 38, the flat surfaces of finger teeth 44 and track teeth 40 are in contact and prevent lower vertical support 24 from sliding down upper vertical support 22. The sloping side of the track teeth 40 and finger teeth 44 allow finger teeth 44 to properly seat themselves in between track teeth 40 when an object is hung from the lower hanger. The number of possible height adjustments and the distance between successive adjustment points are determined by the size of and distance between the teeth. Smaller incremental adjustments in the overall length of adjustable length over-the-door hanger 20 are possible when track teeth 40 and finger teeth 44 are closer together and smaller. However, smaller teeth may prevent adjustable length over-the-door hanger 20 from supporting heavier objects on the door. Therefore, the teeth size should be determined based upon the degree of support and adjustability that are desired.

Figure 9:
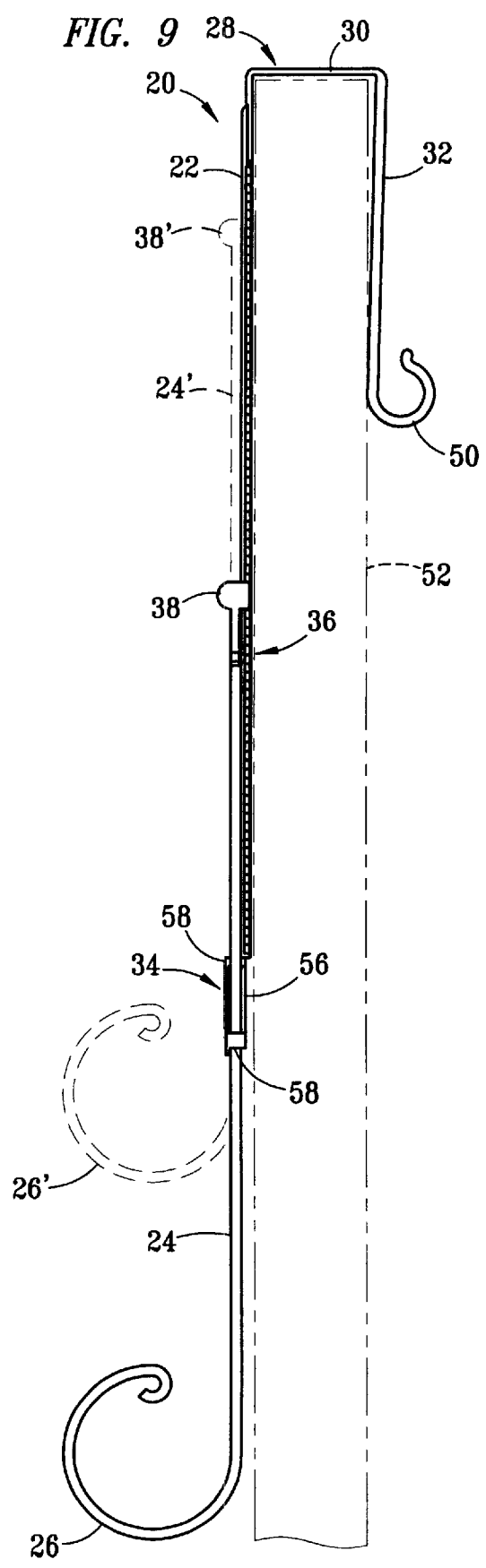
FIG. 9 is a right side elevation view of the adjustable hanger installed on a door, shown in phantom outline, with an alternate position of the lower vertical support shown in dashed outline.

FIG. 9 shows the adjustable length over-the-door hanger 20 in use on door 52. As shown in dashed outline, adjustable length over-the-door hanger 20 originally was in an upper position to allow an object to be hung higher up on door 52. Lower hook 26', lower vertical support 24' and engagement finger 38' show the position of the lower vertical support in the first position. When engagement finger 38' is disengaged from engagement track 36 and lower vertical support 24' is slid down along upper vertical support 22 a second lower position is reached. At this point pressure is removed from engagement finger 38 and it is allowed to reengage with engagement track 36. This serves to lock lower vertical support 24 into its new lower position. In this position lower hook 26 is lower than its original position 26' allowing an object to be hung lower down on door 52.

Other alterations and modifications of the preferred embodiment described above will become apparent to those of ordinary skill in the art upon reading this disclosure, and it is intended that the scope of the invention disclosed herein be limited only by the broadest interpretation of the appended claims to which the inventor is legally entitled.

What is claimed is:

1. An adjustable length over-the-door hanger comprising:
   an upper vertical support having a top end and a bottom end;
   a lower vertical support having a top end and a bottom end and wherein said lower vertical support has a rear face that is slidably disposed on top of a front face of said upper vertical support;

a door hook at the top end of said upper vertical support;

a lower hook at the bottom end of said lower vertical support;

an enclosure at the bottom of said upper vertical support wherein said enclosure wraps around said lower vertical support and forms a passage through which said lower vertical support freely slides;

an engagement track along a first side of said upper vertical support;

an engagement finger on the top end of said lower vertical support, wherein said engagement finger selectively engages said engagement track, thereby preventing said lower vertical support from sliding down along said upper vertical support; and a support finger on the top end of said lower vertical support and in contact with a second side of said upper vertical support opposite from said first side, thereby maintaining said upper vertical support in position for said engagement finger to selectively engage said engagement track.

2. The adjustable length over-the-door hanger of claim 1 wherein said engagement finger is resiliently biased to remain engaged with said engagement track.

3. The adjustable length over-the-door hanger of claim 2 where said engagement finger is digitally deformable to disengage it from said engagement track.

4. The adjustable length over-the-door hanger of claim 1 wherein said engagement finger is shaped so it is easily disengaged from said engagement track while said hanger is in position on said door.

5. The adjustable length over-the-door hanger of claim 1 wherein said engagement track comprises a plurality of track teeth defining track recesses in between said track teeth and said engagement finger comprises a number of finger teeth which seat in said track recesses thereby engaging said engagement track.

6. The adjustable length over-the-door hanger of claim 5 wherein said track teeth further comprise a horizontal top edge and a sloping bottom edge and said finger teeth comprise a corresponding horizontal bottom edge and a sloping top edge.

7. The adjustable length over-the-door hanger of claim 1, wherein said lower hook comprises a curled circular portion for supportably holding a hanging object.

8. The adjustable length over-the-door hanger of claim 1 wherein said door hook fits over a door having a top, front and back sides and where said door hook holds said adjustable length over-the-door hanger against the front of said door.

9. The adjustable length over-the-door hanger of claim 8 wherein said door hook comprises:

a horizontal piece attached perpendicularly to the top of said upper vertical support and extending over the top side of said door; and inwardly biased vertical piece attached to said horizontal piece opposite from said upper vertical support and extending down the rear side of said door.

10. The adjustable length over-the-door hanger of claim 1 wherein in said door hook frictionally engages said door.

11. The adjustable length over-the-door hanger of claim 1 further comprising a groove in the support finger and said upper vertical support further comprising a support track on said second side that slides through said groove in a said support finger.

* * * * *